United States Patent

Ishimatsu

[11] Patent Number: 5,808,840
[45] Date of Patent: Sep. 15, 1998

[54] ACTUATOR ASSEMBLY FOR REDUCING THERMAL OFF-TRACK

[75] Inventor: Noriaki Ishimatsu, Tokyo, Japan

[73] Assignee: NEC Corporation, Tokyo, Japan

[21] Appl. No.: 866,295

[22] Filed: May 30, 1997

Related U.S. Application Data

[63] Continuation of Ser. No. 376,531, Jan. 23, 1995, abandoned, which is a continuation of Ser. No. 72,008, Jun. 7, 1993, abandoned.

[30] Foreign Application Priority Data

Jun. 5, 1992 [JP] Japan ..................................... 4-145142

[51] Int. Cl.⁶ ................................................. G11B 21/02
[52] U.S. Cl. ............................................................ 360/106
[58] Field of Search .................................. 360/104, 105, 360/106, 109, 98.05, 107

[56] References Cited

U.S. PATENT DOCUMENTS

| | | | |
|---|---|---|---|
| 4,698,709 | 10/1987 | Ihlenburg et al. | 360/104 |
| 4,710,834 | 12/1987 | Brand et al. | 360/106 |
| 4,739,430 | 4/1988 | Manzke et al. | 360/106 |
| 4,939,611 | 7/1990 | Connolly | 360/106 |
| 4,984,115 | 1/1991 | Takahashi et al. | 360/106 |
| 5,003,420 | 3/1991 | Hinlein | 360/106 |
| 5,027,242 | 6/1991 | Nishida et al. | 360/106 |
| 5,134,608 | 7/1992 | Strickler et al. | 360/106 |
| 5,161,077 | 11/1992 | Jabbari | 360/106 |
| 5,184,265 | 2/1993 | Foote et al. | 360/106 |
| 5,301,078 | 4/1994 | Makino et al. | 360/106 |

FOREIGN PATENT DOCUMENTS

| | | | |
|---|---|---|---|
| 60-182067 | 9/1985 | Japan | 360/106 |
| 62-62483 | 3/1987 | Japan . | |
| 62-164281 | 7/1987 | Japan . | |

*Primary Examiner*—David L. Ometz
*Attorney, Agent, or Firm*—Sughrue, Mion, Zinn, Macpeak & Seas, PLLC

[57] ABSTRACT

A housing assembly for magnetic head supporting arms of a magnetic disk device includes a housing which has a cylindrically shaped through-hole having two bearings each provided at each end of the through-hole and is formed integrally with supporting arms for supporting magnetic heads. The housing has a cylindrically shaped collar which is constituted by a member having the same linear expansion coefficient as that of the bearings and is fitted between the bearings in an exact fitting dimensional relationship with the bearings. The housing has a slit which extends through an entire axial length and is disposed in a wall defining the through-hole of the housing. The thermal strain in the head supporting arms integral with the housing can be suppressed so as not to be influenced by a temperature rise of the device or a temperature change of environments.

11 Claims, 2 Drawing Sheets

FIG. I
PRIOR ART
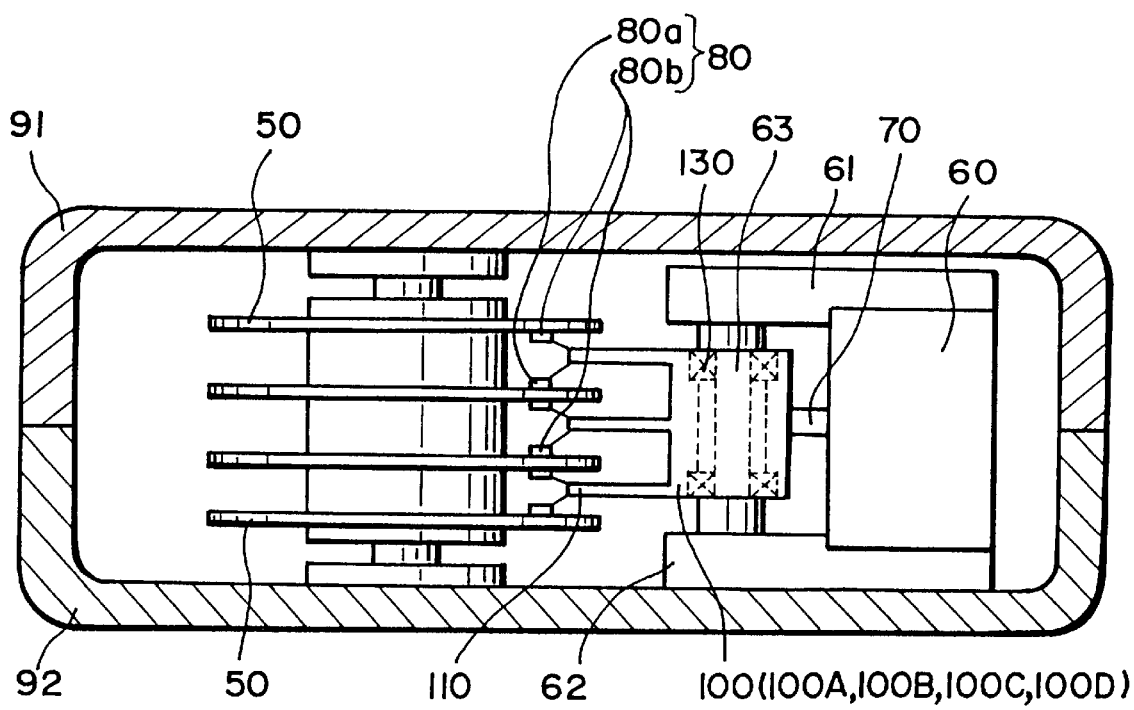
FIG. 2
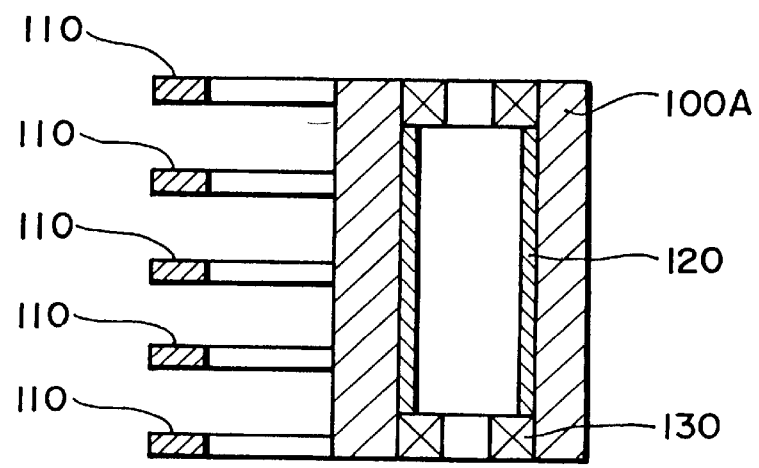

ACTUATOR ASSEMBLY FOR REDUCING THERMAL OFF-TRACK

This is a Continuation of application Ser. No. 08/367,531 filed on Jan. 23, 1995, abandoned, which is a continuation of application Ser. No. 08/072,008 filed on Jun. 7, 1993 abandoned.

BACKGROUND OF THE INVENTION (1) Field of the Invention

The present invention relates to a head/disk assembly for a magnetic disk device and a housing assembly for head supporting arms in a magnetic head positioning mechanism for use in the head/disk assembly for the magnetic disk device.

(2) Description of the Related Art

Generally, in a head/disk assembly for a magnetic disk device, it is necessary to move and position the related magnetic head quickly in a diametrical direction thereof in order to minimize the time for reading data from the magnetic disk. As seen in FIG. 1, the magnetic head 80 has a servo head 80a and a data head 80b respectively facing the corresponding surfaces of the magnetic disks 50 and is movable in a diametric direction on the magnetic disks 50 by a swinging motion of the supporting arm 110. The magnetic head 80 is thus positioned at a target position on the magnetic disk 50. The control of positions of the magnetic head 80 is performed by a servo circuit mechanism in a closed loop in the following manner. That is, the servo head 80a having a position detection function detects a position of the correlated data head 80b; a coil 70 of a voice coil motor is energized by a voice coil motor control circuit (not shown) and a force is produced between the magnetic circuit 80 and the coil 70 due to the magnetic field generated by the permanent magnet in the magnetic circuit 60; the housing 100, formed integrally with the supporting arms 110 which are in a unit with the coil 70, is caused to swing about the central pivot 63 on the bearings 130 by the force produced at the coil 70 thereby moving the magnetic heads 80 mounted on the supporting arms 110; and thereafter the operation for detecting a position of a data head 80b continues in the same manner by the servo head 80a.

In order to enhance the storage density of a magnetic disk device and to increase the storage capacity of the device, it is necessary to enhance the precision in the positioning of the magnetic head with respect to the magnetic disk concerned. In a conventional magnetic disk device, the magnetic head positioning mechanism has a servo head exclusively for effecting the positioning. This servo head reads the positioning data stored in advance on the magnetic disk surface and performs the positioning based on the read-out positioning data. Thus, the magnitude of any relative positioning error between the servo head and the correlated read/write data head and any relative displacement between the servo disk having the positioning data thereon and the data disk is a magnitude of deviation from the track to be followed, that is, the amount of off-track. It is needless to say that the smaller the amount of off-track, the greater will be the positioning precision. However, in actual operation, the amount of off-track beyond tolerance tends to be caused by various factors. The off-track caused by, among various factors, a temperature rise in the device or a change in environments is called a "thermal-off track" whose main cause is considered to reside in the differences in the linear expansion coefficients in various structural elements constituting the magnetic disk device.

In the head/disk assembly explained above, the bearings 130 are inserted into a through-hole at its upper part and its lower part of the housing integrally constituting the supporting arms 110 for the magnetic heads 80 and these bearings 130 bear a central pivot. Thus, any temperature change in the device itself or in the environments causes a thermal strain or distortion to occur due to a difference in the thermal expansion between the bearing-inserted portions of the housing 100 and the solely cylindrical portion of the housing 100. The thermal strain develops in the supporting arms 110 integral with the housing 100 and causes the relative positioning error between the servo arm carrying the servo head 80a and the data arm carrying the data head 80b, which leads to an unwanted off-track and a data-read error.

SUMMARY OF THE INVENTION

It is, therefore, an object of the present invention to overcome the problems existing in the conventional arrangement explained above and to provide an improved housing for supporting arms of the magnetic heads which eliminates the thermal off-track and the data-read error, and also to provide an improved head/disk assembly for the magnetic disk device using such housing.

According to one aspect of the invention, there is provided a housing assembly for magnetic head supporting arms of a magnetic disk device, the housing assembly comprising:

a housing which has a cylindrically shaped through-hole having two bearings each provided at each end of the through-hole and is formed integrally with supporting arms for supporting magnetic heads;

a central pivot which is inserted through the through-hole and supports the housing through the bearings; and a position control means which causes the housing to rotate about the central pivot and controls positioning of the magnetic heads, the housing having a cylindrically shaped collar which is constituted by a member having the same linear expansion coefficient as that of the bearings and is fitted between the bearings in an exact fitting dimensional relationship with the bearings.

BRIEF DESCRIPTION OF THE DRAWINGS

The above and other objects, features and advantages of the present invention will be apparent from the following description of preferred embodiments of the invention explained with reference to the accompanying drawings, in which:

FIG. 1 is a diagrammatic partial sectional view showing an internal structure of a conventional head/disk assembly;

FIG. 2 is a diagrammatic vertical sectional view showing a housing of a first embodiment according to the invention;

PREFERRED EMBODIMENTS OF THE INVENTION

Figure 3:
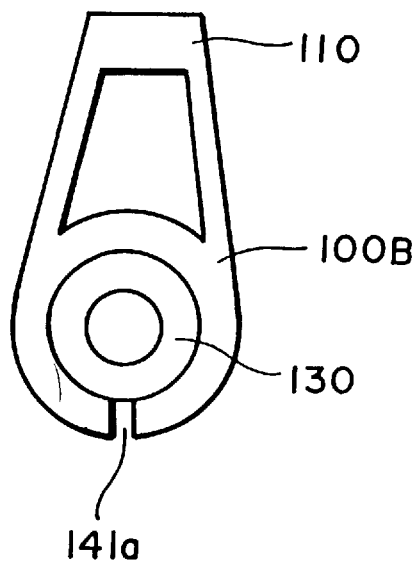
FIG. 3 is a top view of a housing of a second embodiment according to the invention.

Now, explanation is made of preferred embodiments of the invention with reference to the accompanying drawings.

The internal structure of the conventional head/disk assembly has already been explained with reference to FIG.

1. Since the structure of the head/disk assembly according to the present invention except for the structure of the housing itself is substantially the same as that of the conventional one, FIG. 1 is incorporated by reference for the following explanation.

A central pivot 63 and a magnetic circuit 60 are provided between an upper holding plate 61 and a lower holding plate 62. A housing 100A, 100B, 100C or 100D formed integrally with supporting arms 110 carrying the magnetic heads 80 is held by the central pivot 63 through bearings 130. The housing 100A, 100B, 100C and 100D is provided with a coil 70 which, upon being energized, produces an electromagnetic action with the magnetic circuit 60. This causes the housing 100A, 100B, 100C or 100D to rotate about the central pivot 63 as the axis of rotation. All these elements functioning together constitute the magnetic head positioning mechanism. Each of the magnetic heads 80 has a servo head 80a and a data head 80b which are used respectively as servo track seeking and as data track seeking. The magnetic disk section and the above magnetic head positioning mechanism section are covered by an upper case member 91 and a lower case member 92. All other structures and functions not related to the housing 100A, 100B, 100C or 100D are similar to or the same as those in the prior art, so that any further explanation therefor is not made here. The feature of the invention resides in the configurations of each of the housings 100A, 100B, 100C and 100D, which are now explained as the respective embodiments of invention.

FIG. 2 shows in diagrammatic partial sectional view a housing 100A of a first embodiment according to the invention. A collar 120 uses a material having the same linear expansion coefficient as that of the bearings 130 and is fitted, in the same dimensional relationship as that of the bearings 130, between the upper bearing and the lower bearing in an inside diametric portion of the housing 100A. Since the housing 100A is provided with the cylinder of the same material as the bearings 130, the diametrical thermal deformation of the housing 100A is the same at any point in the axial direction and the thermal deformations of the supporting arms 110 integral with the housing 100A are also the same without being influenced by a temperature change in the device itself or in the environments, which will not be the case where the housing 100 is provided with only the bearings 130 as shown in FIG. 1.

FIG. 3 is a top plan view of a housing 100B of a second embodiment according to the invention. In the housing 100B of this embodiment, the two bearings 130 are respectively inserted into the upper and lower inner diametric portions of the housing 100B, and a slit 141a extending through the entire axial length is provided at a position opposite from the supporting arm 110 of the housing 100B. The thermal deformation resulting in strain is caused by a temperature rise in the device or a temperature change in the environments because of the differences in the linear expansion coefficients between the portion of the housing 100B at which the bearings 130 are inserted and the remaining portion of the housing 100B. However, by providing the slit 141a in the housing 100B, the thermal strain in the housing 100B is effectively absorbed and the thermal deformations in the supporting arms 110 integral with the housing 100B are suppressed to the minimum.

Figure 4A:
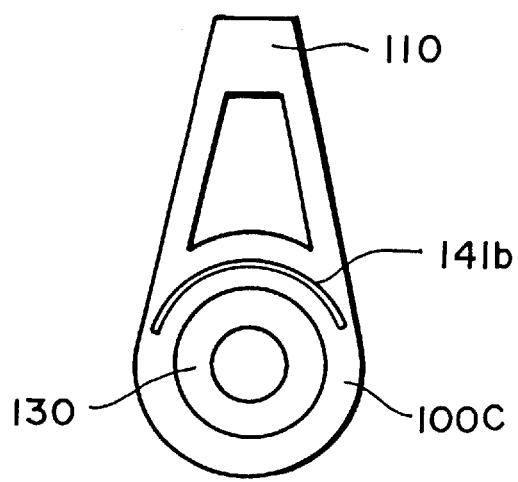
FIGS. 4A and 4B are top views of housings of a third and a fourth embodiment, respectively, according to the invention.
Figure 4B:
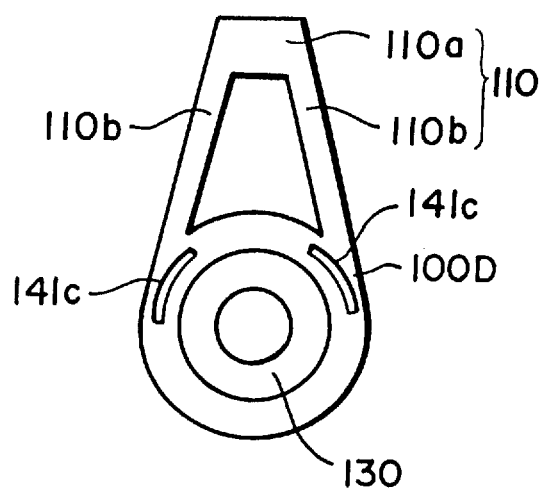

FIGS. 4A and 4B are top plan views of housings 100C and 100D of still another embodiment according to the present invention. In the housing 100C shown in FIG. 4A, two bearings 130 are inserted respectively into the upper and lower inner diametric portions of the housing 100C, and a slit 141b in an arcuate segment extends along the periphery and in a vicinity of the bearings 130 in the supporting arms 110 integral with the housing 100C. Thus, although the thermal deformation resulting in strain is caused by the differences in the linear expansion coefficients between the portion of the housing 100C at which the bearings 130 are inserted and the remaining portion of the housing 100C, the slit 141b effectively absorbs the thermal strain in the housing 100C and the thermal deformations in the supporting arms 110 integral with the housing 100C are suppressed to the minimum.

As shown in FIG. 4B, where the supporting arms 110 are such that each of their one ends is contiguous to the housing 100D and each of the other ends has two ribs 110b joined together at a rib joining portion 110a, there is provided a slit 141c having two arcuate segments each extending along the periphery and in a vicinity of a base portion of each of the ribs 110b. By dividing the slit into the two arcuate segments in this way, it is possible to make, without sacrificing the effect of the suppression of the thermal deformation, the structure more rigid and stable as compared with the housing 100C having the undivided one slit 141b shown in FIG. 4A.

The main feature of the invention thus resides in the arrangement wherein the housing has the cylindrically shaped collar which is constituted by the member having the same linear expansion coefficient as that of the bearings and is fitted between the bearings in an exact fitting dimensional relationship with the bearings. Thus, the thermal deformation of the bearings and that of the collar are the same and the thermal deformation of the supporting arm unit integral with the housing can also be made the same in its entirety.

Another feature of the invention resides in the arrangement wherein the housing has a slit which extends through an entire axial length and is disposed in a wall defining the through-hole of the housing. The slit absorbs any thermal strain caused by differences in the linear expansion coefficients between the housing and the bearings and any influence of the thermal deformation to the supporting arms integral with the housing can be suppressed to the minimum.

Still another feature of the invention resides in the arrangement wherein the housing has at least one slit in an arcuate segment extending along a periphery thereof and through an entire axial length thereof at a base portion of the supporting arm unit. The slit absorbs the thermal strain in the housing and the thermal deformation in the supporting arms integral with the housing is suppressed to the minimum.

A further feature of the invention is in a head/disk assembly for a magnetic disk device having a magnetic head positioning mechanism equipped with the housing assembly of head supporting arms as described above, and a plurality of rotatable magnetic disks for storing data.

As explained above, where the housing according to the present invention is embodied in the head/disk assembly of the magnetic disk device, it is possible to suppress the thermal strain in the head supporting arm units integral with the housing so as not to be influenced by a temperature rise of the device itself or a temperature change of environments. Thus, it is possible to suppress to the minimum any relative positioning error or thermal off-track that may develop between the servo arm mounted on the servo head and the data arm mounted on the data head, whereby an error in reading data can be prevented.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A housing assembly for magnetic head supporting arms of a magnetic disk device, said housing assembly comprising:

a housing which has a cylindrically shaped through-hole having two bearings each provided at each end of said through-hole and is formed integrally with said supporting arms which have distal ends for supporting magnetic heads;

a central spindle which is inserted through said through-hole and supports said housing through said bearings; and a position control means which causes said housing to rotate about said central spindle and controls positioning of said magnetic heads, said housing having a slit structure which arcuately extends along a periphery of the housing and through an entire axial length of the housing at a base portion of said supporting arms between said through-hole and said distal ends of said supporting arms.

2. A housing assembly for magnetic head supporting arms of a magnetic disk device according to claim 1, in which said slit structure is divided into two equal arcuate slits.

3. A housing assembly as claimed in claim 1, wherein equal portions of said slit structure are disposed on opposite sides of a median of said housing assembly which is normal to an axis of rotation of said housing assembly.

4. A housing assembly as claimed in claim 1, wherein said bearings and said housing are made of the same material.

5. A housing assembly as claimed in claim 1, wherein said slit structure absorbs thermal strain generated in said housing at said through-hole to prevent said thermal strain from translating to said distal ends of said supporting arms.

6. A housing assembly as claimed in claim 1, wherein said slit structure absorbs thermal strain generated in said housing due to differences in coefficients of linear expansion between said bearings and said housing.

7. A head/disk assembly for a magnetic disk device having a plurality of rotatable magnetic disks which store data, comprising:

a magnetic head positioning mechanism which comprises:

a housing which has a cylindrically shaped through-hole having two bearings each provided at each end of said through-hole and is formed integrally with supporting arms which have distal ends for supporting magnetic heads;

a central spindle which is inserted through said through-hole and supports said housing through said bearings; and a position control means which causes said housing to rotate about said central spindle and controls positioning of said magnetic heads, said housing having a slit structure which arcuately extends along a periphery of the housing and through an entire axial length of the housing at a base portion of said supporting arms between said through-hole and said distal ends of said supporting arms.

8. A head/disk assembly as claimed in claim 7, wherein equal portions of said slit structure are disposed on opposite sides of a median of said housing assembly which is normal to an axis of rotation of said housing assembly.

9. A housing assembly as claimed in claim 7, wherein said bearings and said housing are made of the same material.

10. A head/disk assembly as claimed in claim 7, wherein said slit structure absorbs thermal strain generated in said housing at said through-hole to prevent said thermal strain from translating to said distal ends of said supporting arms.

11. A head/disk assembly as claimed in claim 7, wherein said slit structure absorbs thermal strain generated in said housing due to differences in coefficients of linear expansion between said bearings and said housing.

* * * * *

UNITED STATES PATENT AND TRADEMARK OFFICE
CERTIFICATE OF CORRECTION

PATENT NO. : 5,808,840
DATED : September 15, 1998
INVENTOR(S) : Noriaki ISHIMATSU It is certified that error appears in the above-identified patent and that said Letters Patent is hereby corrected as shown below:

Col. 1, line 34, change "80" to --60--.

Signed and Sealed this

Twenty-seventh Day of April, 1999

*Attest:*

Q. TODD DICKINSON

*Attesting Officer*   Acting Commissioner of Patents and Trademarks